E. R. & J. W. AULSON.
HIDE WORKING MACHINE.
APPLICATION FILED OCT. 25, 1917.

1,279,963.

Patented Sept. 24, 1918.
4 SHEETS—SHEET 1.

Inventors:
Edward R. Aulson,
John W. Aulson,
by Walter E. Lombard Atty.

E. R. & J. W. AULSON.
HIDE WORKING MACHINE.
APPLICATION FILED OCT. 25, 1917.

1,279,963.

Patented Sept. 24, 1918.
4 SHEETS—SHEET 3.

Inventors,
Edward R. Aulson,
John W. Aulson,
by Walter E. Lombard
Atty.

E. R. & J. W. AULSON.
HIDE WORKING MACHINE.
APPLICATION FILED OCT. 25, 1917.

1,279,963.

Patented Sept. 24, 1918.
4 SHEETS—SHEET 4.

Inventors:
Edward R. Aulson,
John W. Aulson,
by Walter E. Lombard,
Atty.

UNITED STATES PATENT OFFICE.

EDWARD R. AULSON, OF WAUKEGAN, ILLINOIS, AND JOHN W. AULSON, OF LYNN, MASSACHUSETTS, ASSIGNORS TO J. W. AULSON & SONS, OF WAUKEGAN, ILLINOIS, A FIRM CONSISTING OF JOHN W. AULSON AND PHILLIP G. AULSON, BOTH OF LYNN, MASSACHUSETTS, AND EDWARD R. AULSON, OF WAUKEGAN, ILLINOIS.

HIDE-WORKING MACHINE.

1,279,963.              Specification of Letters Patent.       Patented Sept. 24, 1918.

Application filed October 25, 1917. Serial No. 199,786.

*To all whom it may concern:*

Be it known that we, EDWARD R. AULSON and JOHN W. AULSON, citizens of the United States of America, and respectively residents of Waukegan, county of Lake, State of Illinois, and Lynn, county of Essex, and State of Massachusetts, have invented certain new and useful Improvements in Hide-Working Machines, of which the following is a specification.

This invention relates to hide working machines and has for its object the production of a machine of this class of simple construction, which will be very effective in operation.

This invention further consists in certain novel features of construction and arrangement of parts which will be fully understood by reference to the description of the drawings and to the claims hereinafter given.

For the purpose of illustrating the invention one preferred form thereof is illustrated in the drawings, this form having been found to give satisfactory and reliable results, although it is to be understood that the various instrumentalities of which the invention consists, can be variously arranged and organized and that the invention is not limited to the precise arrangement and organization of these instrumentalities as herein shown and described, except as required by the scope of the appended claims.

Of the drawings.

Similar characters designate like parts throughout the several figures of the drawings.

Figure 1:
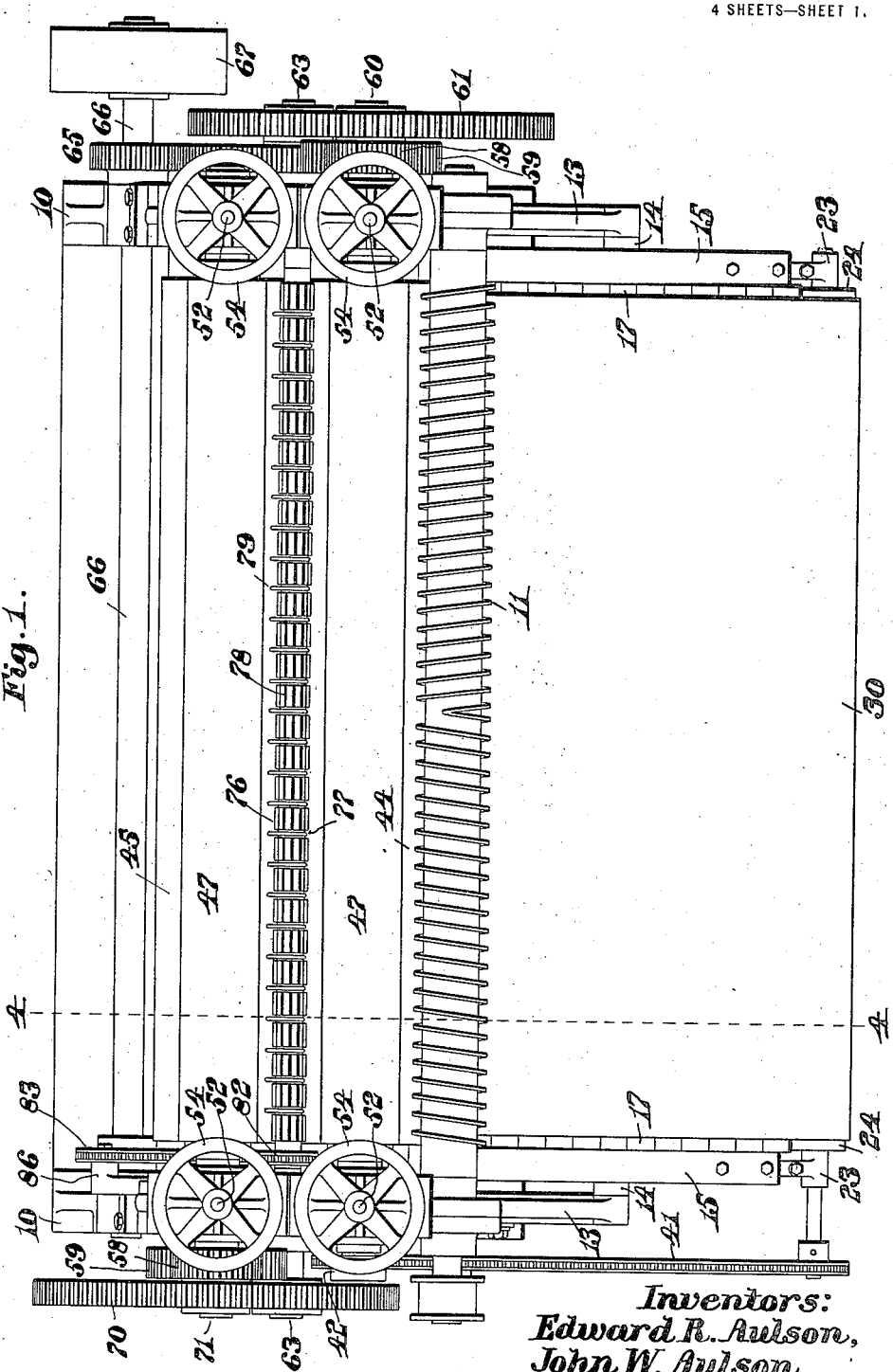
Figure 1 represents a plan of a machine embodying the principles of the present invention.
Figure 2:
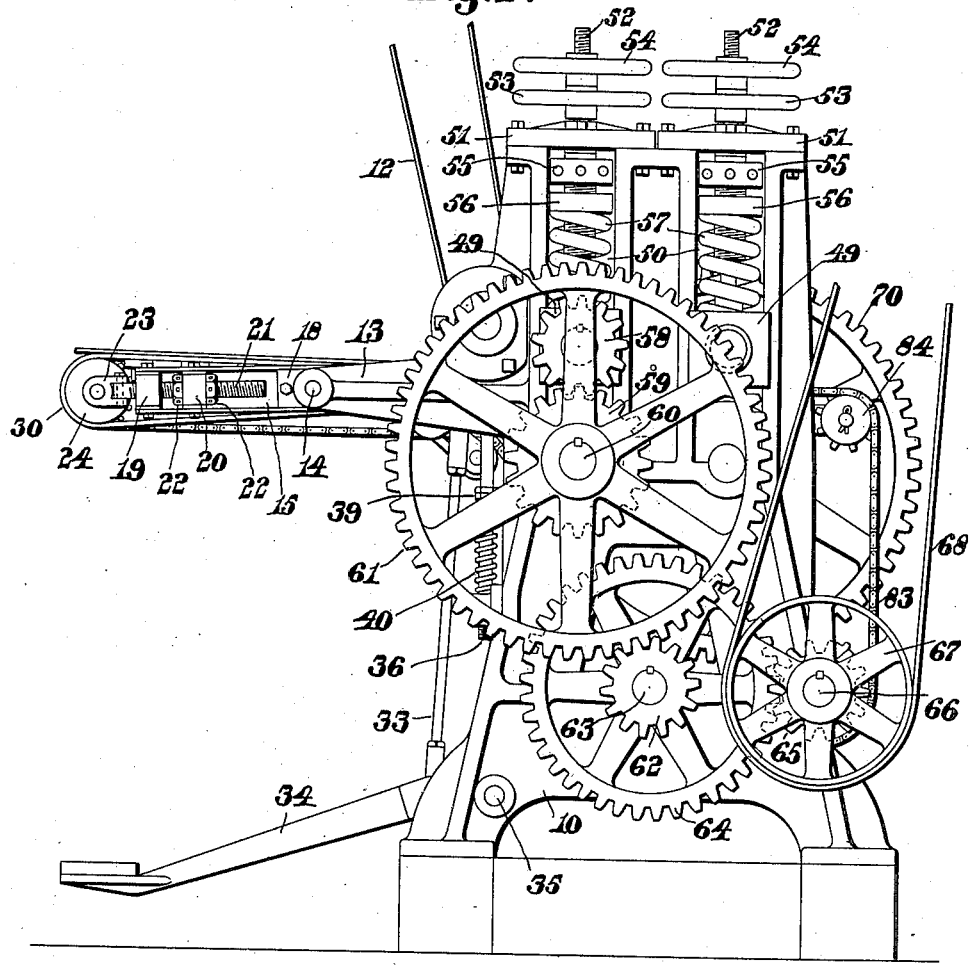
Fig. 2 represents a right hand end elevation of the same.
Figure 3:
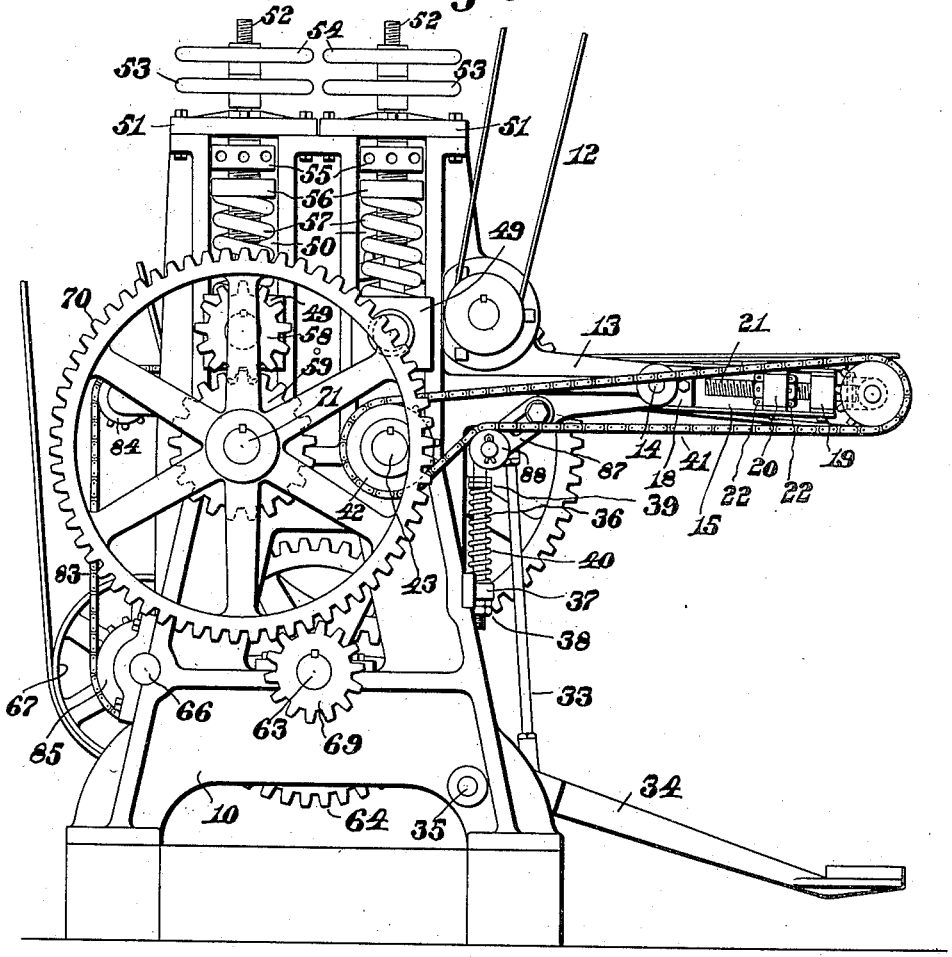
Fig. 3 represents a left hand end elevation of the same.
Figure 5:
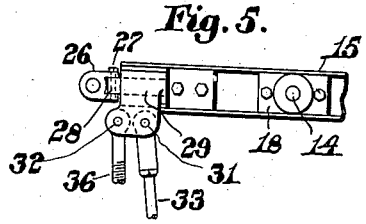
Fig. 5 represents a detail of the pivoted work supporting platform.
Figure 4:
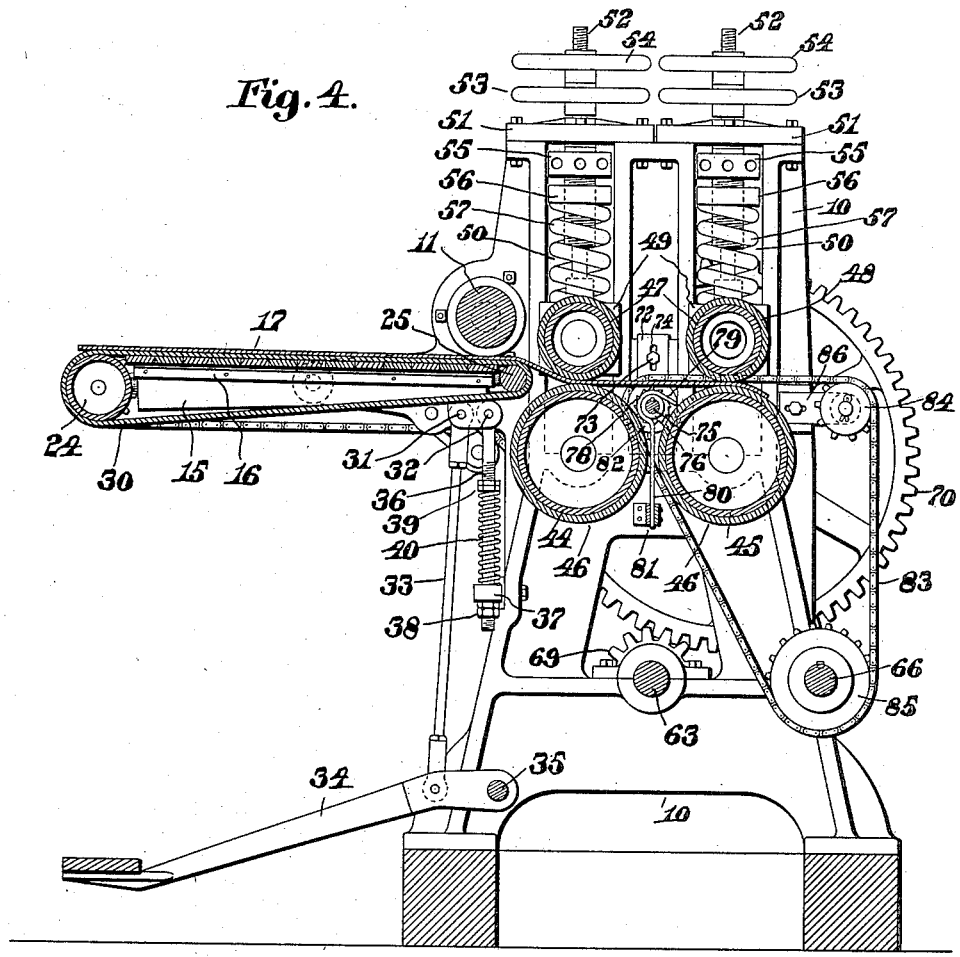
Fig. 4 represents a vertical section of the same on line 4—4, Fig. 1.

In the drawings 10—10 are two end frames in which is revolubly mounted a working knife cylinder 11, adapted to be rotated by means of the belt 12. Each end frame is provided with a forwardly extending arm 13, to each of which is pivoted, at 14, a bar 15, which bar 15 has secured to its inner face an angle iron 16. To the upper faces of the angle irons 16 is secured a wooden platform 17. The pivot member 14 is formed upon a block 18 secured to the outer face of each bar 15 at a point substantially midway of its length.

At the outer end of each bar 15 is secured a block 19, and to the rear of said block 19 and spaced therefrom, is another block 20. Through the blocks 19 and 20 extends a threaded member 21, having threaded thereto nuts 22 on opposite sides of the block 20. By loosening the nuts 22 the threaded member 21 may be adjusted in the blocks 19 and 20 and clamped in adjusted position.

To the front end of each threaded member 21, is pivoted a member 23 provided with a bearing for a roll 24. At the opposite end of the platform 17 is another revoluble roll 25 provided with trunnions mounted in bearings in members 26 pivoted at 27 to the projections 28 on block 29 secured to the rear ends of the bars 15.

Mounted on the rolls 24 and 25 and passing over the platform 17 is an endless belt 30 adapted to support the material to be operated upon. The block 29 is provided with two pivot pins 31 and 32. A connector 33 extends from one pivot pin 31 to a treadle 34 pivoted at 35 to the frames 10. By depressing the treadle 34, the platform 17 may be moved about the pivots 14 so that the rear end thereof will be depressed from contact with the working knife cylinder 11. From the other pivot pin 32 depends a threaded rod 36 the lower end of which extends through an opening in the bar 37 and has threaded thereto nuts 38 to limit the upward movement of the rear end of the platform 17.

The threaded member 36 is also provided with adjustable nuts 39 between which and the boss 37 secured to an end frame 10 is interposed a spring 40 adapted to keep the rear end of the platform 17 in its highest position. The roll 24 is rotated by means of an endless chain 41, driven by a sprocket wheel 42 keyed to a trunnion 43 forming a part of the front feed roll 44 revolubly mounted in the frames 10. To the rear of the feed roll 44 is a similar feed roll 45, both of these feed rolls being covered with rubber or other resilient material 46. Above each feed roll 44 or 45 is a pressure roll 47 said pressure roll being covered with rubber or other resilient material 48. The pressure rolls 47 are mounted in bearings in boxes 49 adapted to be adjusted vertically in the slots 50 formed in the frames 10. Each slot 50 is provided with a closing cap 51 through which extends a threaded rod 52 secured to the slidable box 49.

The upper end of each rod 52 is provided with an adjustable nut 53 and a lock nut 54 which nuts limit the downward movement of the box 49. Surrounding each rod 52 is a threaded housing 55 having a square nut 56 thereon, said nut 56 being adapted to be moved vertically in the slot 50 by the rotation of the threaded housing 55. Between the nut 56 and the box 49 is a spring 57 adapted to force the pressure roll 47 toward the revoluble feed roll 44 or 45.

It is obvious that the pressure of the rolls 47 may be varied by varying the position of the square nut 56. Each pressure roll 47 is rotated by a gear 58 keyed to a trunnion thereon. Each gear 58 meshes with a gear 59 mounted upon and revoluble with a trunnion of the feed roll 44 or 45. The trunnion 60 of the front feed roll 44 has keyed thereto, a gear 61, meshing with a pinion 62 keyed to a revoluble shaft 63 mounted in bearings in the frames 10. This shaft 63 has secured thereto a gear 64 meshing with a pinion 65 on the driving shaft 66 revolubly mounted in bearings in the frames 10. The shaft 66 has keyed thereto a driving pulley 67 adapted to be driven by means of a belt 68. The shaft 63 has also secured thereto a pinion 69 meshing with a gear 70 keyed to the trunnion 71 of the rear feed roll 45. To the inner faces of the end frames 10 are secured members 72 adapted for vertical adjustment by means of the clamping bolts 73 extending through slots 74 therein. These members 72 have revolubly mounted therein a shaft 75 on which is mounted a roll 76 having a plurality of annular peripheral grooves 77. Each section of the roll 76 between the annular grooves 77 is provided with a plurality of ratchet teeth 78. These teeth in the rotation of the roll 76 are adapted to engage the material passing over the roll 44 and guide said material over the roll 76 to the feed roll 45. In each groove 77 is positioned a curved hooked member 79 having a rearwardly extending finger the end of which is adjacent to the periphery of the rear feed roll 45. The hooked member 79 is provided with a depending portion 80 positioned in a slot in a bar 81 secured at its opposite ends to the inner faces of the side frames 10. The shaft 75 has keyed thereto a sprocket wheel 82 which is driven by means of a sprocket chain 83 passing over the idler sprocket wheel 84 and driven by a sprocket wheel 85 keyed to the shaft 66.

The idler sprocket wheel 84 is pivotally mounted on the block 86 adjustably mounted on the end frames 10, thereby providing means whereby the chain 83 may be kept taut at all times.

Each forwardly extending arm 13 has secured thereto an adjustable member 87 having pivotally mounted thereon a roller 88 engaging the chain 41, thereby keeping the chain 41 taut at all times.

In the operation of the machine the material to be operated upon is placed upon the apron 30 while the rear end of the platform 17 is depressed by the treadle 34. After the material has been positioned on the platform 17 the operator releases the treadle 34 thereby permitting the work to be forced by the spring 40 into contact with the working knife cylinder, the distance of the apron 30 from said knife cylinder being determined by the adjustment of the nuts 38.

By the movement of the apron the material is fed beneath the knife cylinder 11 to the feed rolls 44 and 45 and beneath the pressure rolls 47.

The teeth 78 of the roll 76 will engage the material as it moves over the feed roll 44 and direct said material to the feed roll 45, the fingers 79 preventing it from passing downward between the two feed rolls.

This makes a very simple and effective machine for operating on hides, the operation and many advantages of which will be fully understood without further description.

Having thus described our invention, we claim:

1. In a machine of the class described, the combination of a working knife cylinder; a pivoted work supporting platform, with its free end beneath said working cylinder; means for feeding the material; yielding means for normally retaining the rear end of said platform in engagement with said cylinder; and means under the control of the operator for moving the rear end of said work support away from said working cylinder.

2. In a machine of the class described, the combination of a working knife cylinder; a pivoted work supporting platform, with its free end beneath said working cylinder; an endless apron on said platform; means for moving said apron; means for feeding the material; yielding means for normally retaining the rear end of said platform in engagement with said cylinder; and means under the control of the operator for moving the rear end of said work support away from said working cylinder.

3. In a machine of the class described, the combination of a working knife cylinder; a work supporting platform pivoted intermediate its ends with its rear end beneath said working cylinder; means for feeding the material; yielding means for normally retaining said rear end in engagement with said cylinder; and means under the control of the operator for moving the said platform about its pivot.

4. In a machine of the class described, the combination of a working knife cylinder; a work support beneath said knife cylinder; two revoluble feed rolls; a pressure roll coacting with each feed roll; and a toothed revoluble member interposed between said feed rolls, adapted to insure the material passing from one feed roll to the other.

5. In a machine of the class described, the combination of a working knife cylinder; a work support beneath said knife cylinder; two revoluble feed rolls; a pressure roll coacting with each feed roll; and a revoluble member interposed between said feed rolls having a plurality of toothed surfaces and adapted to insure the material passing from one feed roll to the other.

6. In a machine of the class described, the combination of a working cylinder; a work support beneath said knife cylinder; two revoluble feed rolls; a pressure roll for each feed roll; and a revoluble member interposed between said feed rolls and adapted to guide the material from one feed roll to the other, said member having a plurality of annular serrated surfaces.

7. In a machine of the class described, the combination of a working cylinder; a work support beneath said knife cylinder; two revoluble feed rolls; a pressure roll for each feed roll; a revoluble member interposed between said feed rolls and adapted to guide the material from one feed roll to the other, said member having a plurality of annular serrated surfaces; and a plurality of fingers interposed between said serrated surfaces and extending toward the periphery of the rear feed roll.

8. In a machine of the class described, the combination of a working cylinder; a work support beneath said working cylinder; two revoluble feed rolls; a pressure roll for each feed roll; and a revoluble member having a plurality of annular surfaces provided with ratchet teeth interposed between said feed rolls and adapted to guide the material from one feed roll to the other.

9. In a machine of the class described, the combination of a working cylinder; a work support beneath said knife cylinder; two revoluble feed rolls; a pressure roll for each feed roll; a revoluble member interposed between said feed rolls and adapted to guide the material from one feed roll to the other, said member having a plurality of annular serrated surfaces; and a plurality of fingers interposed between said serrated surfaces and extending toward the periphery of the rear feed roll, said fingers having downwardly extending portions positioned in slots in a stationary part of the frame.

10. In a machine of the class described, the combination of a working cylinder; a work support beneath said knife cylinder; two revoluble feed rolls; a pressure roll for each feed roll; a revoluble shaft interposed between said feed rolls provided with annular surfaces thereon having peripheral teeth, said surfaces being separated by annular grooves; and members the lower ends of which extend through slots in a stationary part of the frame and having their upper ends curved and positioned in said grooves with the outer faces of said curved portions of less diameter than said toothed surfaces and provided with fingers extending rearwardly to the periphery of the rear feed roll.

11. In a machine of the class described, the combination of a working knife cylinder; a work support beneath said knife cylinder; two revoluble feed rolls; a pressure roll for each feed roll; a toothed revoluble member interposed between said feed rolls and adapted to guide the material from the front feed roll to the rear feed roll; and means for adjusting said toothed member vertically.

12. In a machine of the class described, the combination of a working cylinder; a work support beneath said knife cylinder; two revoluble feed rolls; a pressure roll for each feed roll; a toothed revoluble member interposed between said feed rolls and adapted to guide the material from the front feed roll to the rear feed roll; fingers extending from said toothed member to the rear feed roll; and means for adjusting said toothed member and said fingers vertically.

13. In a machine of the class described, the combination of a working knife cylinder, revolubly mounted in bearings in side frames having forward extensions; a work supporting member pivoted at a point intermediate its length to said forward extensions; a projection at the rear of each side of said work supporting member; a bearing pivoted to each projection; a roll in said bearings; a projection at the forward end of each side of said work supporting member; a bearing pivoted to each forward projection; a revoluble roll mounted in said bearings; an apron on said rolls; and means for driving one of said rolls.

14. In a machine of the class described, the combination of a working knife cylinder, revolubly mounted in bearings in side frames having forward extensions; a work supporting member pivoted at a point intermediate its length to said forward extensions; a projection at the rear of each side of said work supporting member; a bearing pivoted to each projection; a roll in said bearings; a projection at the forward end of each side of said work supporting member; a bearing pivoted to each forward projection; a revoluble roll mounted in said bearings; an apron on said rolls; means for driving one of said rolls; and means for adjusting said forward projections endwise.

15. In a machine of the class described, the combination of a working cylinder; a pivoted work supporting platform with its rear free end beneath said knife cylinder; a movable apron carried by said platform; a member on each side of the forward end of said platform provided with two pivot members; a treadle connection on one pivot member; a rod depending from the other pivot member; a stationary bar through which the lower ends of said rods extend; nuts threaded to the lower ends of said rods to limit the upward movement of said platform; a spring surrounding said rod and resting on said bar; and nuts threaded to said rods above said springs to regulate the tension thereof.

Signed by me at Waukegan, Illinois, this 13th day of October, 1917.

EDWARD R. AULSON.

Witnesses:
H. E. MARTIN,
RUSSELL H. EDWARDS.

Signed by me at 4 Post Office Sq., Boston, Mass., this 10th day of October, 1917.

JOHN W. AULSON.

Witnesses:
WALTER E. LOMBARD,
NATHAN C. LOMBARD.

Copies of this patent may be obtained for five cents each, by addressing the "Commissioner of Patents, Washington, D. C."